United States Patent [19]
Heckendorf

[11] 3,732,844
[45] May 15, 1973

[54] OMNIDIRECTIONAL SENSOR

[75] Inventor: Howard A. Heckendorf, Brookfield, Wis.

[73] Assignee: General Motors Corporation, Detroit, Mich.

[22] Filed: June 30, 1971

[21] Appl. No.: 158,418

[52] U.S. Cl. ................116/114 AH, 73/492, 73/514, 74/2, 222/5
[51] Int. Cl. ............................................G01d 21/00
[58] Field of Search ..................116/114 R, 114 AH; 73/492, 514; 222/5, 80, 81, 83; 74/2, 3

[56] References Cited

UNITED STATES PATENTS

| 3,013,524 | 12/1961 | York | 116/114 AH |
| 3,020,875 | 2/1962 | Browning | 116/114 AH |
| 3,145,571 | 8/1964 | Maynard et al. | 73/492 |
| 3,418,964 | 12/1968 | Peterson | 116/114 R |
| 3,581,577 | 6/1971 | Ray, Jr. et al. | 73/492 |
| 3,592,156 | 7/1971 | Prachar | 116/114 |

Primary Examiner—Louis J. Capozi
Attorney—W. E. Finken et al.

[57] ABSTRACT

An omnidirectional sensor includes a base plate having a rectangularly shaped aperture therethrough. An operating arm is swingably mounted on the plate to one side thereof and spring biased to actuated position. A pair of spring arms extend from the operating arm through the aperture and are normally biased together. A retainer plate seats on the base plate to the other side thereof and includes an aperture aligned with the base plate aperture and also receiving the spring arms. A circular embossed rib surrounds the aperture. A cylindrical seismic mass seats on the retainer plate within the rib and is held against movement by a magnet surrounding a central cylindrical extension which forces the spring arms apart and engages lateral flanges thereof with the retainer plate adjacent the aperture to retain the operating arm against movement to actuated position. Upon tilting movement of the seismic mass under an acceleration pulse of predetermined amplitude and time, the extension thereof is withdrawn from between the spring arms to permit the arms to move together and move through the aperture as the operating arm moves to actuated position.

4 Claims, 3 Drawing Figures

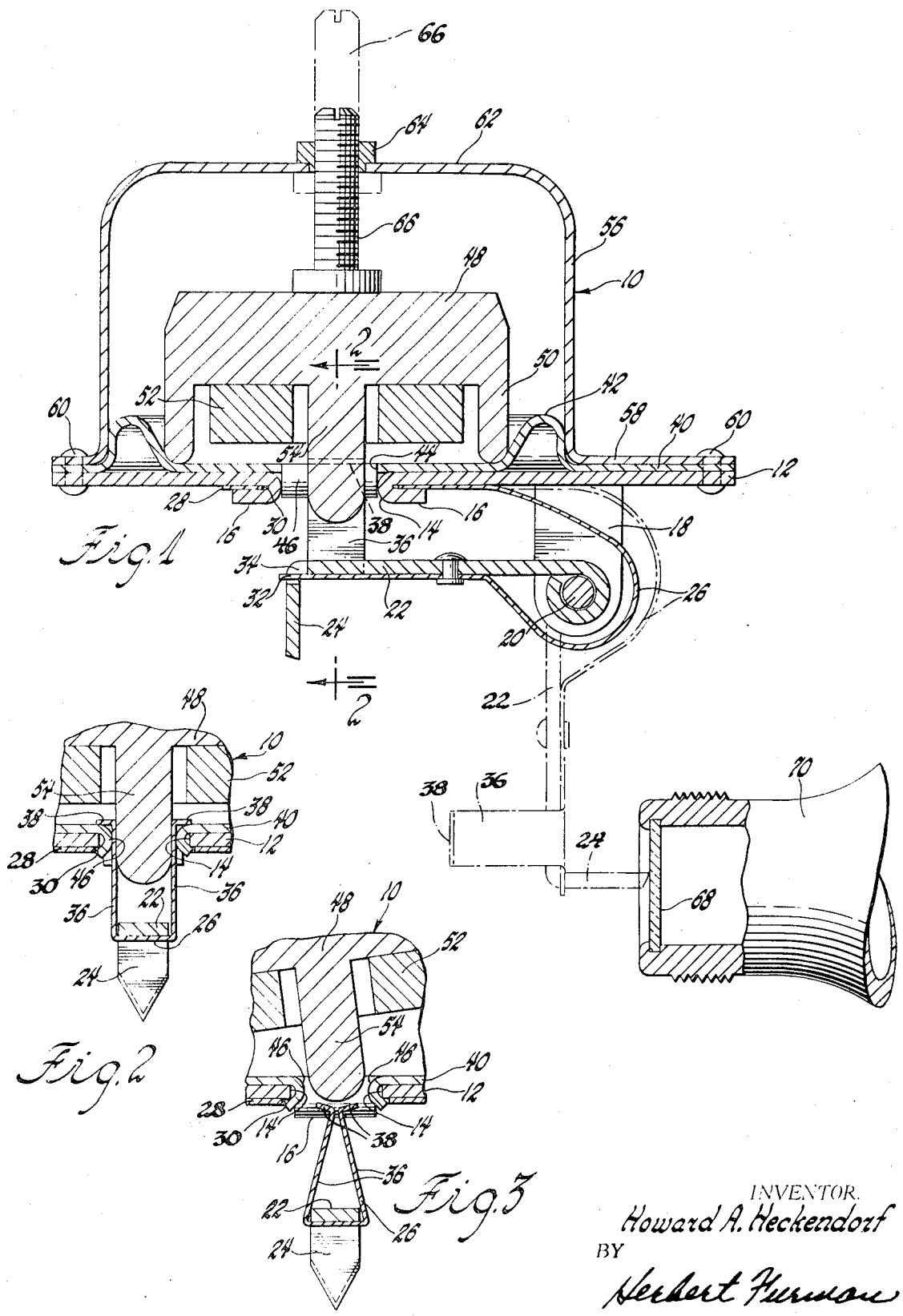

OMNIDIRECTIONAL SENSOR

This invention relates to omnidirectional sensors and more particularly to omnidirectional sensors of the type wherein a seismic mass controls movement of an operator to actuated position in accordance with the amplitude and time of an acceleration pulse received by the mass.

One feature of this invention is that the operator is normally biased to actuated position and is held in unactuated position by the engagement of detent means carried thereby with a support adjacent an aperture receiving the detent means therethrough. Another feature is that the detent means are normally biased to undetented position out of engagement with the support for movement through the aperture as the operator moves to actuated position, with the detent means being blocked from movement to undetented position by releasable blocking means controlled by the seismic mass. A further feature is that the blocking means is released from the detent means upon movement of the mass to an actuated position under an acceleration pulse of predetermined amplitude and time. Yet another feature is that the detent means includes a pair of spring arms integrally biased together and including shoulders engageable with the support through the aperture when the spring arms are forced apart by the releasable blocking means. Yet a further feature is that the seismic mass overlies the aperture and the releasable blocking means includes an extension of the mass projected between the arms to force the arms apart when the mass is in unactuated position and engage detent shoulders of the arms with the support adjacent the aperture.

These and other features of the sensor of this invention will be readily apparent from the following specification and drawings wherein:

FIG. 1 is a longitudinal sectional view of a sensor according to this invention shown in full lines in unactuated position and in dash lines in actuated position;

FIG. 2 is a sectional view taken generally along the plane indicated by line 2—2 of FIG. 1; and FIG. 3 is a view similar to FIG. 2 showing the spring arms released and moving with the operator to actuated position.

Referring now particularly to FIG. 1 of the drawings, a sensor 10 according to this invention includes a rectangularly shaped base plate 12 provided with a rectangularly shaped aperture 14. Aperture 14 is slightly elongated along the longitudinal axis of the plate 12 and the material of the aperture along such axis is bent back to form return bent flanges 16 along two sides of the aperture. An integral lanced lateral arm 18 of plate 12 mounts a headed pin or shaft 20. A hammer arm or operator 22 is swingably mounted on the pin 20 and includes a lateral sharp-pointed extension 24. A leaf spring member 26 encircles the operator 22 and includes a generally rectangularly shaped mounting portion 28 provided with a like-shaped closed aperture 30. The return bent flanges 16 are received through the aperture 30 prior to being bent back upon themselves to thereby secure the spring member 26 to the base plate 12. The spring member 26 further includes a tab 32 which extends through an aperture 34 at the junction of extension 24 and the operator, and a pair of integral spring arms 36. As shown in FIGS. 2 and 3, each spring arm 36 is provided with a terminal lateral flange or extension 38 to detent operator 22 as will be hereinafter described. The arms 36 are integrally biased together to their position shown in FIG. 3. In this position it will be noted that the arms are freely movable through the aperture 14.

A retainer plate 40 seats on the plate 12 and is provided with an integral upwardly embossed circular rib 42 and an aperture 44 of the same shape as and aligned with the aperture 14. A portion of the material on two sides of the aperture 44 is bent slightly inwardly as shown in FIGS. 2 and 3 to provide guide flanges 46 for the flanges 38 as will be hereinafter described.

A cylindrical seismic mass 48 includes a depending skirt or wall 50 which seats on the retainer plate 40 within the rib 42. The mass 48 is thus located against any sliding movement relative to the retainer plate. The mass further includes a permanent toroidal magnet 52, the flux of which cooperates with plates 40 and 12 to normally hold the seismic mass 48 in unactuated position as shown. When the mass receives an acceleration pulse of predetermined amplitude and time, the flux of magnet 52 is overcome and the mass will then tilt relative to the retainer plate 40 to actuated position. The mass 48 further includes an integral axially extending cylindrical extension 54 which projects downwardly and between the arms 36 as shown in FIG. 2 to force the arms apart against their integral bias and engage the flanges 38 with the retainer plate 40 adjacent the aperture 44 and flanges 46. The operator 22 is thus normally held in its unactuated position, shown in full lines in FIG. 1, against the bias of spring member 26.

A cylindrical cover 56 includes a rectangularly shaped peripheral base flange 58 which seats on the plate 40. The flange 58, plate 40, and plate 12 are riveted together at 60 as shown. The cover 56 surrounds and seats against the rib 42 and includes an aperture in its upper wall 62 which receives and is secured to a nut 64. A bolt 66 is threaded in the nut to provide a safety. When the bolt is threaded to its position shown in full lines in FIG. 1, it engages the upper wall of the mass 48 to prevent any movement of the mass and likewise any movement of the operator 22 to actuated position. When the bolt is threaded to its position shown in dash lines in FIG. 1, it, of course, permits movement of the mass 48 under a pulse of the required amplitude and time.

From the foregoing description, it can be seen that when the mass 48 is in its normal position and the bolt 66 is in its upwardly threaded position, the sensor 10 is in an operating mode. The operator 22 is held against any movement by the engagement of the flanges 38 with the plate 40 under the blocking action of extension 54 of the mass.

When the mass 48 is subjected to an acceleration pulse of predetermined amplitude and time, the flux of magnet 52 will be overcome and the mass will tilt relative to the plate 40. This tilting movement of the mass will withdraw the extension 54 from between the spring arms 36, as shown in FIG. 3, to permit the integral bias of the arms to move the arms to their position shown in FIG. 3. The flanges 38 slide along flanges 46 as the arms 36 move together and downwardly through the apertures 44 and 14 as the operator 22 swings counterclockwise of pin 20 under the bias of spring member 26.

When the operator moves to actuated position, the sharp-pointed extension 24 thereof engages a glass or metal diaphragm 68 which seals a pressure vessel 70 in order to release the contents of the pressure vessel.

Although the operator 22 is shown as directly rupturing a diaphragm of a pressure vessel, it need not perform this function but can perform other functions such as closing a switch or actuating a detonator or squib, either of which may control rupture of a diaphragm sealing a pressure vessel.

The sensor 10 of this invention is particularly intended for use in a vehicle body occupant restraint system which includes an occupant restraint cushion inflatable from a pressure fluid source when the vehicle is subjected to an impact sufficient to generate an acceleration pulse of the required amplitude and time. In such a system, the operator 22 may mechanically, electrically, or explosively initiate or control release of the pressure fluid from the source to initiate the inflation of the occupant cushion.

Thus, this invention provides an improved omnidirectional sensor.

I claim:

1. A sensor comprising, in combination, a support having a portion thereof provided with an aperture therethrough, an operator member, means mounting the operator member on the support for movement relative thereto between unactuated and actuated positions, means biasing the operator member to actuated position, spaced detent means mounted on the operator member for movement therewith and movement independent thereof relative to each other between detented and undetented positions, the detent means being integrally biased to undetented position, the detent means in detented position extending through the aperture and engaging one side of the support portion to maintain the operator member in unactuated position against the action of the operator member biasing means, the detent means disengaging the support portion upon movement to undetented position and moving through the aperture as the operator member moves to actuated position under the action of the operator member biasing means, seismic mass means mounted on the support for movement to actuated position upon receipt thereby of an acceleration pulse of predetermined amplitude and time, retainer means, means mounting the retainer means on the support for movement between holding and released positions with respect to the detent means, the retainer means in holding position holding the detent means against movement from undetented position to thereby retain the operator member in unactuated position, and means moving the retainer means to released position upon movement of the seismic mass means to actuated position to permit the detent means to move to undetented position and permit the operator member biasing means to move the operator member to actuated position.

2. A sensor comprising, in combination, a support having a portion thereof provided with an aperture therethrough, an operator member, means mounting the operator member on the support for movement relative thereto between unactuated and actuated positions, means biasing the operator member to actuated position, detent means mounted on the operator member for movement therewith and movement independent thereof between detented and undetented positions, the detent means being integrally biased to undetented position, the detent means in detented position extending through the aperture and engaging one side of the support portion to maintain the operator member in unactuated position against the action of the operator member biasing means, the detent means disengaging the support portion upon movement to undetented position and moving through the aperture as the operator member moves to actuated position under the action of the operator member biasing means, seismic mass means mounted on the support for movement from unactuated to actuated positions upon receipt thereby of an acceleration pulse of predetermined amplitude and time, and retainer means mounted on the seismic mass means and holding the detent means against movement to undetented position when the seismic mass means is in unactuated position, the retainer means moving to a released position with respect to the detent means upon movement of the seismic mass means to actuated position to permit the detent means to move to undetented position and permit the operator member biasing means to move the operator member to actuated position.

3. A sensor comprising, in combination, a support having a portion thereof provided with an aperture therethrough, an operator member, means mounting the operator member on the support for movement relative thereto between unactuated and actuated positions, means biasing the operator member to actuated position, a pair of spaced shouldered arms mounted on the operator for movement therewith and movement independent thereof relative to each other, the arms being integrally biased together to adjacent position, the arms in adjacent position freely moving through the aperture as the operator member moves to actuated position, the arms being forceable apart to a remote position extending through the aperture and engaging the shoulders thereof with one side of the support portion to maintain the operator member in unactuated position, seismic mass means mounted on the support for movement to actuated position upon receipt thereby of an acceleration pulse of predetermined amplitude and time, retainer means forcing the arms apart to remote position, and means moving the retainer means to a released position with respect to the spaced arms upon movement of the seismic mass means to actuated position to permit the arms to move to adjacent position and permit the operator member biasing means to move the operator member to actuated position.

4. A sensor comprising, in combination, a support having a portion thereof provided with an aperture therethrough, an operator member, means mounting the operator member on the support for movement relative thereto between unactuated and actuated positions, means biasing the operator member to actuated position, a pair of spaced spring arms having respective shoulder means and mounted on the operator member for movement therewith and movement independent thereof together and apart relative to each other between adjacent and remote positions, the arms being integrally biased to adjacent position, the arms in remote position extending through the aperture and the shoulder means thereof engaging one side of the support portion to maintain the operator member in unactuated position, the arms in adjacent position freely moving through the aperture as the operator member moves to actuated position, a seismic mass mounted on the support for movement from unactuated to actuated positions upon receipt thereby of an acceleration pulse of predetermined amplitude and time, and retainer means on the seismic mass moving the arms apart to remote position in the unactuated position of the seismic mass to retain the operator member in unactuated position against the action of the operator member biasing means, the arms being released for movement to adjacent position upon movement of the seismic mass to actuated position to permit the operator member biasing means to move the operator member to actuated position.

\* \* \* \* \*